UNITED STATES PATENT OFFICE.

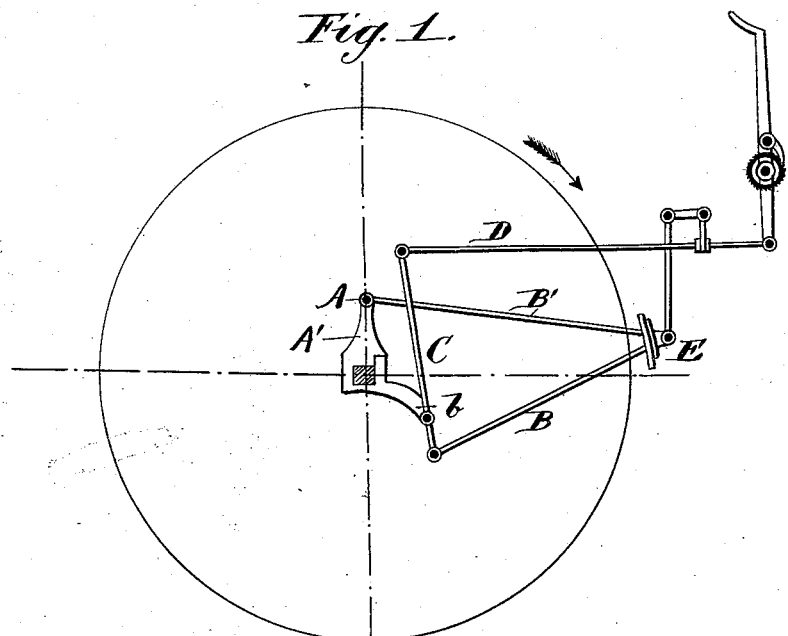

LOUIS BOIRON, OF LYONS, FRANCE.

BRAKE FOR VEHICLES.

SPECIFICATION forming part of Letters Patent No. 469,958, dated March 1, 1892.

Application filed September 2, 1891. Serial No. 404,576. (No model.)

*To all whom it may concern:*

Be it known that I, LOUIS BOIRON, a citizen of the Republic of France, residing at Lyons, in France, have invented certain new and useful Improvements in Brakes, of which the following is a specification.

My invention has relation to brakes for vehicles; and it consists in the construction, arrangement, and combination of parts hereinafter claimed.

The main feature of this improved brake is that its pivot or center of motion is situated above or away from the center of the wheel. It may be connected with the axle or vehicle by a bracket of any suitable shape. The power of the brake is increased by arranging the pivot or fulcrum in such a manner that the shoe is as nearly as possible tangential to the periphery of the wheel, when it will exercise its action under a very acute angle, the weight of its component parts being therefore alone sufficient to stop the wheel instantaneously.

In the accompanying drawings, Figure 1 is a side elevation of one form of the improved brake, and Figs. 2 and 3 are like views of modifications of the same.

Like letters designate like parts in all three figures.

A is the fulcrum or central pivot, which a suitable bracket or web A' connects either to the axle of the wheel when the axle does not revolve or to the body of the carriage.

B B' are two links supporting the shoe-carrying rod, and C is an intermediate lever adapted to actuate the links B B'. It may be supported by a bracket-extension b.

D is the operating-rod, which receives motion from any suitable device—such as a hand-wheel, lever-arm, handle, or pedal—arranged within reach of the driver, guard, or other operator.

E is the shoe-carrying rod or link.

If desired, a spring F, Fig. 3, may be arranged upon the connecting-link B' to enable this link to be extended, so as to compensate the wear by which the strictly circular shape of the circumference of the wheel is destroyed.

H is a spring attached to the body of the vehicle for the suspension of the brake-shoes.

The brake-shoe also may be supported by a spring. The arrows indicate the direction of rotation of the wheels.

When the attendant moves the handle or the like to apply the brake, the rod or link D moves forward and the other link B backward. The rod or shaft E is depressed in consequence and the brake-shoes are brought into contact with the periphery of the wheel at an angle exercising a more powerful check upon the wheel according to the increased acuteness of that angle. To relieve the wheel, all that is necessary is to push the link D, when the shaft E will rise and remove the shoes from contact with the wheel. The brakes may also, if desired, be arranged behind the wheels, (instead of in front,) when the action of the levers must, of course, be reversed.

I claim—

1. In a vehicle-brake, the combination, with the brake-shoe rod E, carrying the brake-shoe arranged tangentially with respect to the periphery of the wheel, of the link B, connected at one end to said rod E and supported at its other end eccentrically to the wheel-axle, the link B', also connected at one end to the rod E and supported at its other end eccentrically to the wheel-axle, and means for operating the link B, and consequently the brake-shoe, to cause it to act upon the wheel at an acute angle, as and for the purpose specified.

2. In a vehicle-brake, the combination, with the brake-shoe rod E, carrying a brake-shoe arranged tangentially with respect to the periphery of the wheel, of the link B, connected at its outer end to said rod, the link B', also connected at its outer end to said rod and having its inner end pivoted eccentrically with respect to the wheel-axle, the link C, pivoted intermediate its ends eccentrically with respect to the wheel-axle and also at one of its ends to the inner end of the link B, and the operating-rod D, pivoted at its inner end to the opposite end of said link C, as and for the purpose specified.

3. In a vehicle-brake, the combination, with the brake-shoe rod E, carrying a brake-shoe arranged tangentially with respect to the periphery of the wheel, of the link B, connected at its outer end to the rod E, the link B', also connected at its outer end to said rod, a spring arranged to act upon the inner end of link B', said end being supported eccentrically with respect to the wheel-axle, the link C, pivoted intermediate its ends and also at one end to the inner end of link B, and the operating-rod D, connected at its inner end to one end of the link C, as and for the purpose specified.

In testimony whereof I have hereto set my hand in the presence of the two subscribing witnesses.

LOUIS BOIRON.

Witnesses:
 JEAN BAPTISTE VERGEOT,
 JEAN MARIE CHEVENOR.